(12) United States Patent
Wu et al.

(10) Patent No.: US 11,067,878 B2
(45) Date of Patent: Jul. 20, 2021

(54) LASER PROJECTION DEVICE

(71) Applicant: HISENSE LASER DISPLAY CO., LTD., Qingdao (CN)

(72) Inventors: Kai Wu, Qindao (CN); Longmin Li, Qingdao (CN); Xu Chen, Qingdao (CN)

(73) Assignee: HISENSE LASER DISPLAY CO., LTD., Qingdao (CN)

( * ) Notice: Subject to any disclaimer, the term of this patent is extended or adjusted under 35 U.S.C. 154(b) by 0 days.

(21) Appl. No.: 16/821,907

(22) Filed: Mar. 17, 2020

(65) Prior Publication Data

US 2020/0401028 A1 Dec. 24, 2020

Related U.S. Application Data

(63) Continuation of application No. PCT/CN2020/078872, filed on Mar. 11, 2020.

(30) Foreign Application Priority Data

Jun. 20, 2019 (CN) .......................... 201910537271.3
Jul. 16, 2019 (CN) ......................... 201910642306.X

(51) Int. Cl.
*G03B 21/14* (2006.01)
*H04N 9/31* (2006.01)
*G03B 21/20* (2006.01)

(52) U.S. Cl.
CPC ..... *G03B 21/2033* (2013.01); *G03B 21/2013* (2013.01); *H04N 9/3161* (2013.01)

(58) Field of Classification Search
CPC ................ G03B 21/14; G03B 21/2033; G03B 21/2013; H04N 9/31; H04N 9/3161
See application file for complete search history.

(56) References Cited

U.S. PATENT DOCUMENTS

2013/0107133 A1* 5/2013 Chamberlin ........... G03B 21/14
                                                          348/750
2014/0232996 A1* 8/2014 Okamoto ........... G03B 21/2013
                                                          353/85

(Continued)

FOREIGN PATENT DOCUMENTS

CN       106154720 A      11/2016
CN       104156594 A       7/2017

(Continued)

OTHER PUBLICATIONS

International Search Report of PCT/CN2020/078872.

*Primary Examiner* — William C. Dowling
(74) *Attorney, Agent, or Firm* — J.C. Patents

(57) ABSTRACT

A laser projection device includes: a laser light source, including three laser assemblies emitting lasers of different colors; a laser light source driving unit, including: a display control circuit; three power supply driving assemblies connected to the three laser assemblies; and three laser driving assemblies connected to three power supply driving assemblies, where the display control circuit is configured to transmit an enabling signal corresponding to each laser assembly to a corresponding power supply driving assembly when transmitting a PWM signal corresponding to the each laser assembly; each power supply driving assembly is configured to load a driving voltage to a corresponding laser driving assembly according to voltage of a received PWM signal, when a received enabling signal is at active potential; and each laser driving assembly is configured to drive a corresponding laser assembly to emit light according to the driving voltage.

11 Claims, 15 Drawing Sheets

(56) References Cited

U.S. PATENT DOCUMENTS

2015/0212400 A1* 7/2015 Nakanishi .......... G03B 21/2033
  353/31
2016/0164256 A1* 6/2016 Kuratomi ............ H01S 5/06804
  353/85

FOREIGN PATENT DOCUMENTS

| CN | 106933010 A | 7/2017 |
| CN | 107864904 A | 2/2018 |

* cited by examiner

LASER PROJECTION DEVICE

CROSS REFERENCE TO RELATED APPLICATIONS

This disclosure is a continuation application of International Application No. PCT/CN2020/078872, filed on Mar. 11, 2020, which claims priorities to Chinese Patent Application No. 201910537271.3, filed on Jun. 20, 2019 with the CNIPA, entitled "LASER PROJECTION DEVICE", and Chinese Patent Application No. 201910642306.X, filed on Jul. 16, 2019 with the CNIPA, entitled "LASER PROJECTION DEVICE". The contents of all of the aforementioned applications are hereby incorporated by reference in their entireties.

TECHNICAL FIELD

The present disclosure relates to the field of laser projection technologies and, more particularly, to a laser projection device.

BACKGROUND

Laser projection devices, e.g., ultra-short-focus laser TVs, are widely used in the field of display due to their advantages in high color purity, high color gamut and high brightness.

A light source system of an existing laser TV generally includes a laser light source, a fluorescent wheel, and a filter wheel, where the laser light source is typically a blue laser assembly for emitting blue laser light that is irradiated onto three different regions of the fluorescent wheel in sequence to generate light in three colors, and the light in three colors are sequentially filtered by the filter wheel to obtain three-color light with higher purity. However, since the light source system irradiates blue laser light to the fluorescent wheel to generate the three-color light, the control requirement for the fluorescent wheel is high, and the color effect of the three-color light generated by the fluorescent wheel is not very ideal. Thus, trichromatic laser source system has emerged, whose laser light source includes laser assemblies of three colors in order to directly generate the three-color light.

SUMMARY

A first aspect of the present disclosure provides a laser projection device, including:

a laser light source, including three laser assemblies emitting lasers of mutually different colors; and a laser light source driving unit, connected to the laser light source, and including: a display control circuit, configured to: output, based on three primary color components of an image to be displayed, three pulse width modulation (PWM) signals corresponding to the three laser assemblies, and output three enabling signals corresponding to the three laser assemblies; power supply driving assemblies, connected to the display control circuit and configured to receive the PWM signals outputted from the display control circuit, where the power supply driving assemblies include three power supply driving assemblies connected to the three laser assemblies in a one-to-one correspondence; and laser driving assemblies, including three laser driving assemblies connected to the three power supply driving assemblies in a one-to-one correspondence, where the display control circuit is configured to transmit an enabling signal corresponding to each of the laser assemblies to a corresponding one of the power supply driving assemblies when transmitting a PWM signal corresponding to each of the laser assemblies;

each of the power supply driving assemblies is configured to load a driving voltage to a corresponding one of the laser driving assemblies according to a voltage of a received PWM signal, when a received enabling signal is at an active potential; and each of the laser driving assemblies is configured to drive a corresponding one of the laser assemblies to emit light according to the driving voltage.

BRIEF DESCRIPTION OF THE DRAWINGS

In order to more clearly illustrate embodiments of the present disclosure, the drawings required in describing the embodiments will be briefly introduced below.

Apparently, the drawings described in the following are only for some embodiments of the present disclosure, and other drawings can be obtained by those skilled in the art without paying any creative labor.

The accompanying drawings, which are incorporated in and constitute a part of this specification, illustrate embodiments consistent with the present disclosure and, together with the description, serve to explain the principles of the present disclosure.

DESCRIPTION OF EMBODIMENTS

In order to make the objectives, technical solutions and advantages of the present disclosure clearer, the present disclosure will be described in further detail with reference to the accompanying drawings. Obviously, the described embodiments are only a part of the embodiments of the present disclosure, rather than all of them. Based on the embodiments of the present disclosure, all other embodiments obtained by persons of ordinary skill in the art without making any creative effort shall fall within the protection scope of the present disclosure.

Figure 1:
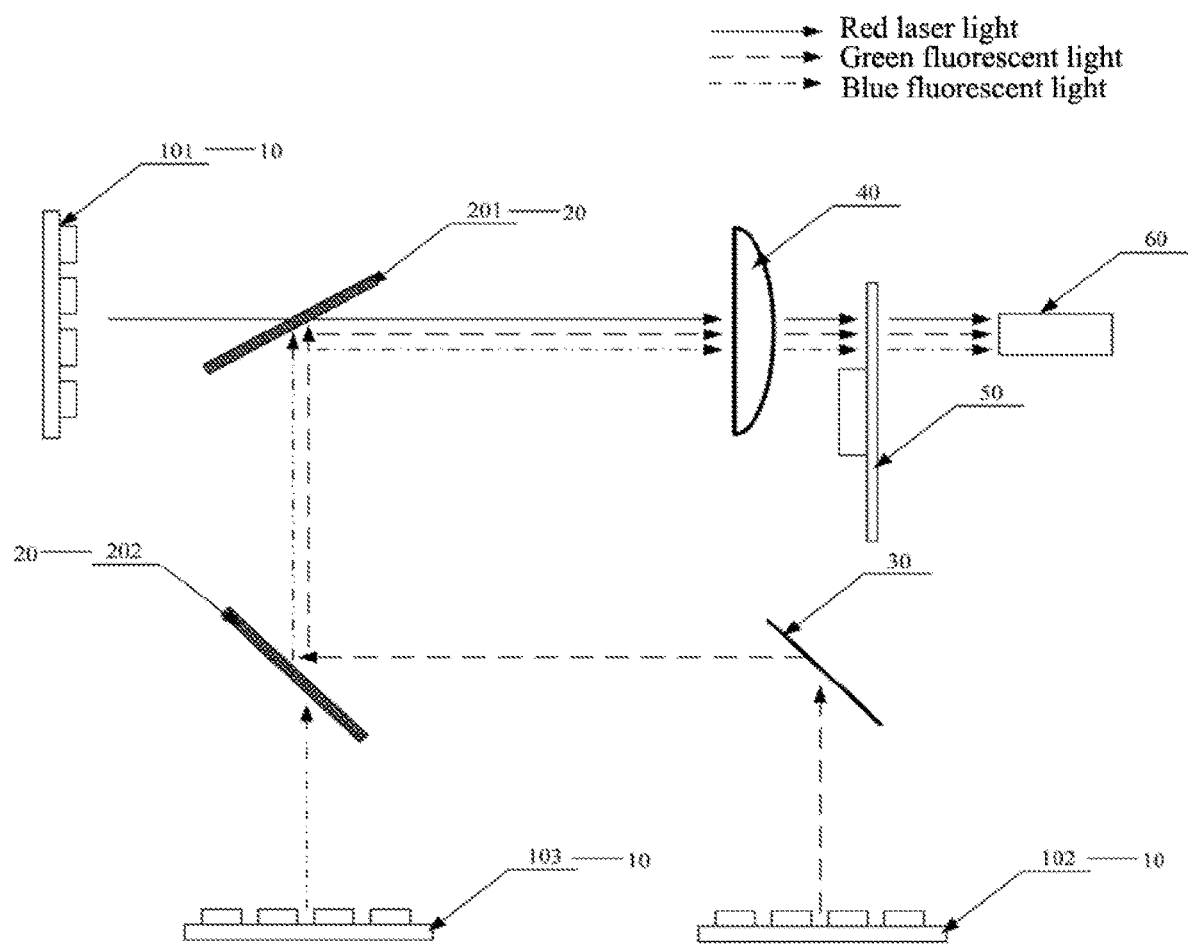
FIG. 1 is a schematic view of a local structure of a light source system.

FIG. 1 illustrates a schematic view of a local structure of a light source system. As shown in FIG. 1, a trichromatic laser source system includes a laser light source 10, two dichroic mirrors 20, a reflecting mirror 30, a condensing lens 40, a diffusion wheel 50, and a light bar 60. For ease of description, the two dichroic mirrors 20 include a first dichroic mirror 201 and a second dichroic mirror 202. The laser light source 10 includes a red laser assembly 101 for emitting red laser light, a green laser assembly 102 for emitting green laser light, and a blue laser assembly 103 for emitting blue laser light. The red laser light emitted by the red laser assembly 101 is transmitted to the condensing lens 40 through the first dichroic mirror 201. The green laser light emitted by the green laser assembly 102 is reflected by the reflecting mirror 30 onto the second dichroic mirror 202 which, in turn, reflects the green laser light onto the first dichroic mirror 201. Then, the green laser light is reflected by the first dichroic mirror 201 onto the condensing lens 40. The blue laser light emitted by the blue laser assembly 103 is transmitted to the first dichroic mirror 201 through the second dichroic mirror 202, and then reflected by the first dichroic mirror 201 onto the condensing lens 40. The laser light irradiated onto the condensing lens 40 is condensed by the condensing lens 40 and then irradiated onto the diffusion wheel 50. The laser light irradiated onto the diffusion wheel 50 is diffused and then irradiated into the light bar 60 to be homogenized to realize an outgoing of three-color light.

Figure 2:
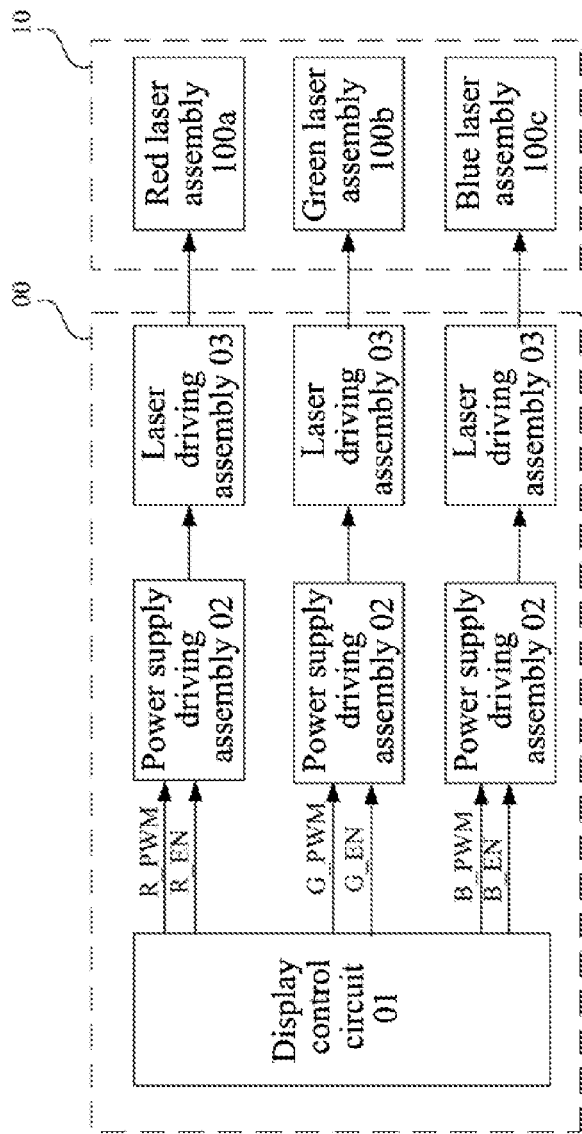
FIG. 2 is a schematic structural view of a laser projection device, in accordance with some embodiments of the present disclosure.

Some embodiments of the present disclosure provide a laser projection device. As shown in FIG. 2, a light source system of the laser projection device includes a laser light source 10 and a laser light source driving unit 00 connected to the laser light source 10. The laser light source 10 includes three sets of laser assemblies emitting lasers of different colors. Illustratively, the embodiment of the present disclosure will be described by taking the three laser assemblies being a red laser assembly 100a, a green laser assembly 100b and a blue laser assembly 100c, respectively, as an example. The driving unit 00 of the laser light source 10 can include: a display control circuit 01; three power supply driving assemblies 02 corresponding to the three laser assemblies; and three laser driving assemblies 03 corresponding to the three laser assemblies, where each laser driving assembly 03 is connected to the corresponding laser assembly.

As can be seen in FIG. 2, the display control circuit 01 is connected to the three power supply driving assemblies 02. The display control circuit 01 is configured to: output three pulse width modulated (PWM) signals corresponding to the three laser assemblies based on three primary color components of an image to be displayed, and transmit each PWM signal to the corresponding power supply driving assembly 02; and output three enabling signals corresponding to the three laser assemblies, and transmit the enabling signal corresponding to each laser assembly to the corresponding power supply driving assembly 02 when transmitting the PWM signal corresponding to the each laser assembly. The PWM signal can be used to control the brightness of the laser assembly, and the enabling signal corresponding to each laser assembly is outputted based on the lighting duration of the laser assembly in the driving period, and is used to control the lighting duration of the laser assembly.

The three power supply driving assemblies 02 are connected to the three laser driving assemblies 03, respectively, in a one-to-one correspondence. Each power supply driving assembly 02 is configured to load a driving voltage to the connected laser driving assembly 03 according to a voltage of the received PWM signal, when the enabling signal at an active potential (e.g., a high potential, a.k.a. a high level) is received.

Each laser driving assembly 03 is configured to drive the connected laser assembly to emit light according to the driving voltage.

Illustratively, as shown in FIG. 2, the laser light source 10 includes the red laser assembly 100a, the green laser assembly 100b, and the blue laser assembly 100c. The display control circuit 01 can output a PWM signal R_PWM corresponding to the red laser assembly based on a red primary color component in the image to be displayed, a PWM signal G_PWM corresponding to the green laser assembly based on a green primary color component in the image to be displayed, and a PWM signal B_PWM corresponding to the blue laser assembly based on a blue primary color component in the image to be displayed. Additionally, the display control circuit 01 can output an enabling signal R_EN corresponding to the red laser assembly based on the lighting duration of the red laser assembly in the driving period, an enabling signal G_EN corresponding to the green laser assembly based on the lighting duration of the green laser assembly in the driving period, and an enabling signal B_EN corresponding to the blue laser assembly based on the lighting duration of the blue laser assembly in the driving period. The red laser assembly 100a, the green laser assembly 100b and the blue laser assembly 100c are respectively connected to the corresponding laser driving assembly 03 in the driving unit.

Accordingly, in the laser projection device provided by the embodiments of the present disclosure, the display control circuit outputs a PWM signal and an enabling signal corresponding to each laser assembly, and transmits the output signals to the corresponding power supply driving assembly which, in turn, loads a driving voltage for the corresponding laser driving assembly according to the PWM signal and the enabling signal, so that the laser driving assembly can drive the laser assembly to emit light, thereby achieving independent control of each laser assembly.

In an implementation, the display control circuit 01 may be a digital light processing (DLP) chip, which may be a DLPC6421 chip, or a DDP4422 chip.

Figure 3:
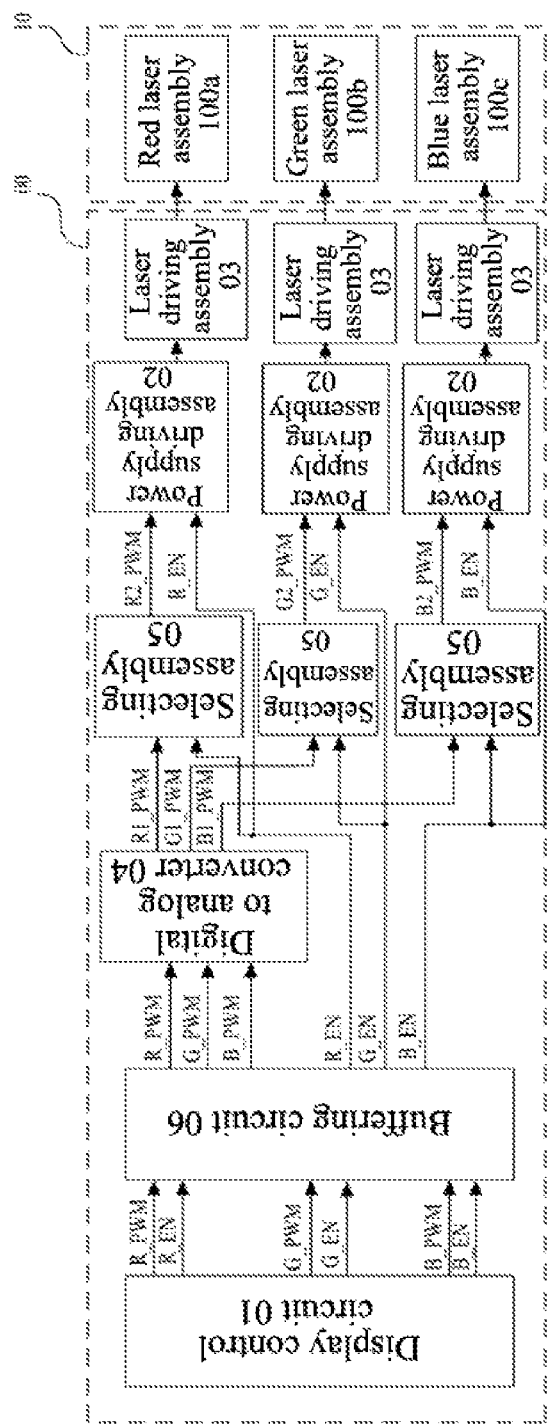
FIG. 3 is a schematic structural view of a laser projection device, in accordance with some embodiments of the present disclosure

FIG. 3 is a schematic structural view of a laser projection device provided in an embodiment of the present disclosure. As shown in FIG. 3, the laser light source driving unit 00 can further include a digital to analog converter (DAC) 04. The digital to analog converter 04 is connected to the display control circuit 01 and the three power supply driving assemblies 02.

The display control circuit 01 is configured to transmit three PWM signals to the digital to analog converter 04. The digital to analog converter 04 is configured to convert each of the received PWM signals into an analog signal, and transmit each analog signal to the corresponding power supply driving assembly 02.

Figure 4:
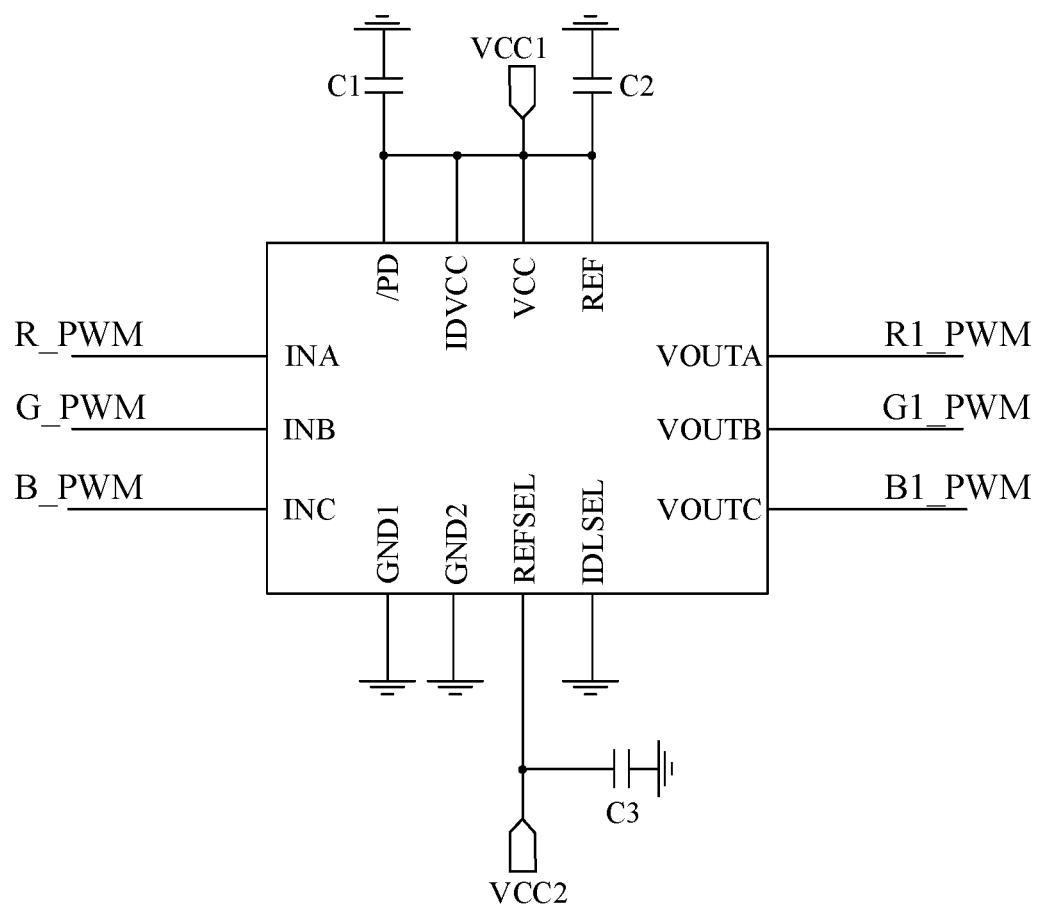
FIG. 4 is a schematic structural view of a digital to analog converter, in accordance with some embodiments of the present disclosure.

FIG. 4 is a schematic structural view of a digital to analog converter provided in an embodiment of the present disclosure. As shown in FIG. 3 and FIG. 4, the digital to analog converter 04 has three input pins, i.e., an INA pin, an INB pin and an INC pin, and three output pins, i.e., a VOUTA pin, a VOUTB pin and a VOUTC pin. The digital to analog converter 04 can further include a /PD pin, an IDVCC pin, a VCC pin, a REF pin, a GND1 pin, a GND2 pin, a REFSEL pin, and an IDLSEL pin.

The INA pin, the INB pin, and the INC pin can all be connected to the display control circuit 01 to respectively introduce the PWM signals R_PWM, G_PWM and B_PWM transmitted by the display control circuit 01.

The VOUTA pin, VOUTB pin, and VOUTC pin can be connected to three power supply driving assemblies 02, respectively, and can be respectively configured to output an analog signal R1_PWM, which is converted from the PWM signal R_PWM, to the power supply driving assembly corresponding to the red laser assembly 100a, an analog signal G1_PWM, which is converted from the PWM signal G_PWM, to the power supply driving assembly corresponding to the green laser assembly 100b, and an analog signal B1_PWM, which is converted from the PWM signal B_PWM, to the power supply driving assembly corresponding to the blue laser assembly 100c. The analog signals B1_PWM, G1_PWM and R1_PWM are all analog direct current (DC) voltage signals.

The /PD pin, IDVCC pin, VCC pin, and REF pin are all connected to ground via capacitors C1 and C2 connected in parallel, and all connected to the power supply terminal VCC1. The GND1 pin, GND2 pin, and IDLSEL pin are all connected to ground. The REFSEL pin is connected to the power supply terminal VCC2 and one terminal of the capacitor C3, and another terminal of the capacitor C3 is connected to ground. A 5V (volt) voltage may be provided by the power supply terminal VCC1 and the power supply terminal VCC2. The parameters of the capacitor C1, capacitor C2 and capacitor C3 are all 100 nF (nanofarad)/16V (that is, the capacitance of each of the capacitor C1, capacitor C2 and capacitor C3 is 100 nF, and the rated voltage is 16V).

In an implementation, as shown in FIG. 3, the laser light source driving unit 00 further includes three selecting assemblies 05 corresponding to the three laser assemblies. Each selecting assembly 05 is connected to the display control circuit 01, the digital to analog converter 04, and the corresponding power supply driving assembly 02.

The display control circuit 01 is further configured to transmit each enabling signal to the corresponding selecting assembly 05. The digital to analog converter 04 is further configured to transmit each analog signal to the corresponding selecting assembly 05. Each selecting assembly 05 is configured to transmit the received analog signal to the corresponding power supply driving assembly 02 when the received enabling signal is at the active potential.

Illustratively, as shown in FIG. 3, the laser light source driving unit 00 can include three selecting assemblies 05 corresponding to the three laser assemblies.

The display control circuit 01 can transmit the enabling signal R_EN corresponding to the red laser assembly, the enabling signal G_EN corresponding to the green laser assembly and the enabling signal B_EN corresponding to the blue laser assembly to their corresponding selecting assemblies 05, respectively. The digital to analog converter 04 can transmit the analog signal R1_PWM corresponding to the R_PWM signal, the analog signal G1_PWM corresponding to the G_PWM signal, and the analog signal B1_PWM corresponding to the B_PWM signal to their corresponding selecting assemblies 05, respectively.

The selecting assembly 05 corresponding to the red laser assembly can transmit the analog signal R1_PWM to the corresponding power supply driving assembly 02 when the received enabling signal R_EN is at the active potential. The selecting assembly 05 corresponding to the green laser assembly can transmit the analog signal G1_PWM to the corresponding power supply driving assembly 02 when the received enabling signal G_EN is at the active potential. The selecting assembly 05 corresponding to the blue laser assembly can transmit the analog signal B1_PWM to the corresponding power supply driving assembly 02 when the received enabling signal B_EN is at the active potential.

Figure 5:
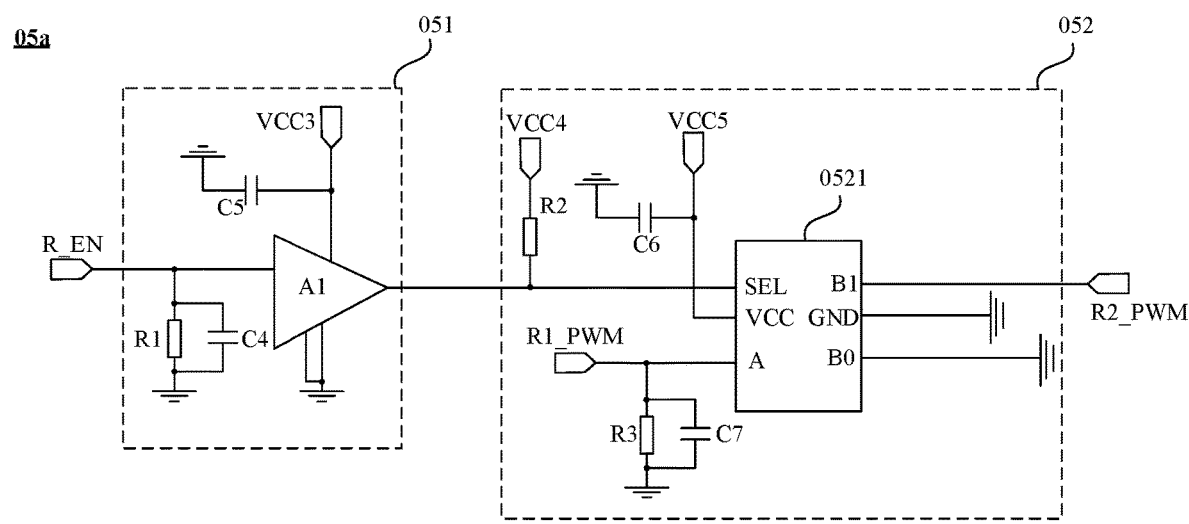
FIG. 5 is a schematic structural view of a selecting assembly corresponding to a red laser assembly, in accordance with some embodiments of the present disclosure.

FIG. 5 is a schematic structural view of a selecting assembly corresponding to a red laser assembly provided in an embodiment of the present disclosure. The embodiment of the present disclosure uses the selecting assembly corresponding to the red laser assembly as an example to describe the structure of the selecting assembly. Referring to FIG. 5, the selecting assembly 05a corresponding to the red laser assembly can include: an adapting sub-circuit 051 and a selecting sub-circuit 052.

The adapting sub-circuit 051 is connected to the display control circuit 01 and the selecting sub-circuit 052, and is configured to convert a voltage of the received enabling signal R_EN to a rated voltage of the selecting sub-circuit 052 and transmit the voltage-converted enabling signal R_EN to the selecting sub-circuit 052.

The selecting sub-circuit 052 is further connected to the digital to analog converter 04, and is configured to transmit the received analog signal R1_PWM to the corresponding power supply driving assembly 02 when the received enabling signal R_EN is at the active potential.

In an implementation, referring to FIG. 5, the adapting sub-circuit 051 can include an operational amplifier A1, a resistor R1, a capacitor C4 and a capacitor C5. The operational amplifier A1 has at least a first port, a second port, a third port, a fourth port, and a fifth port. Both the first port and the third port are connected to ground. The second port is connected to the display control circuit 01 to receive the enabling signal R_EN. The second port is also connected to one terminal of the resistor R1 and the capacitor C4, which are connected in parallel, and another terminal of the resistor R1 and the capacitor C4, which are connected in parallel, are connected to ground. When the received enabling signal R_EN contains spikes or large ripples, the capacitor C4 can be used to filter out the spiky part of the enabling signal R_EN, or to filter out the larger ripples of the enabling signal R_EN. The fourth port is connected to the selecting sub-circuit 052. The fifth port is connected to the power supply terminal VCC3 and one terminal of the capacitor C5, and another terminal of the capacitor C5 is connected to ground.

Referring to FIG. 5, the selecting sub-circuit 052 can include a one-out-of-two selector 0521. The one-out-of-two selector 0521 can include two input pins, i.e., a SEL pin and an A pin, and two output pins, i.e., a B0 pin and a B1 pin. The one-out-of-two selector 0521 also includes a VCC pin and a GND pin. The SEL pin is connected to the fourth port of the operational amplifier A1 in the adapting sub-circuit 051 and one terminal of a resistor R2, and another terminal of the resistor R2 is connected to the power supply terminal VCC4. The VCC pin is connected to the power supply terminal VCC5 and one terminal of a capacitor C6, and another terminal of the capacitor C6 is connected to ground. The A pin is connected to the VOUTA pin of the digital to analog converter 04, and to one terminal of a resistor R3 and a capacitor C7, which are connected in parallel, and is used to receive the analog signal R1_PWM transmitted by the digital to analog converter 04. Another terminal of the resistor R3 and the capacitor C7, which are connected in parallel, is connected to ground. When the received analog signal R1_PWM transmitted by the digital to analog converter 04 contains spikes or large ripples, the capacitor C7 can be used to filter out the spiky part of the analog signal R1_PWM, or to filter out the larger ripples of the analog signal R1_PWM. The B1 pin is connected to the power supply driving assembly 02 corresponding to the red laser assembly to provide the selected PWM analog signal, i.e., R2_PWM signal, to the power supply driving assembly. Both the GND pin and the B0 pin are connected to ground.

A 5V voltage may be provided by the power supply terminal VCC3, the power supply terminal VCC4 and the power supply terminal VCC5. The resistance of the resistors R1, R2 and R3 may all be 10 kΩ (kohm). The parameters of the capacitor C4 and capacitor C7 may be 100 n/16V/NC (that is, the capacitance of each of the capacitor C4 and capacitor C7 is 100 nF, the rated voltage is 16V, and the capacitor C4 and capacitor C7 are backup capacitors that may be not connected temporarily), and the parameters of the capacitor C5 and capacitor C6 may be 100 n/16V.

When the enabling signal R_EN inputted at the SEL pin is at an active potential, the analog signal R1_PWM introduced by the A pin can be outputted from the B1 pin to achieve synchronization between the enabling signal and the analog signal. Meanwhile, the adapting sub-circuit 051 can convert the level of the enabling signal such that the voltage of the enabling signal transmitted by the display control circuit 01 can be adapted to the voltage of the SEL port of the selecting sub-circuit 052, thus ensuring the selecting sub-circuit 052 works normally.

Illustratively, it is assumed that the voltage of each enabling signal outputted by the display control circuit 01 is 3.3V, and the rated voltage of the SEL pin in the selecting sub-circuit 052 is 5V. Each adapting sub-circuit 051 can convert the enabling signal of 3.3V into an enabling signal of 5V through the operational amplifier A1, and transmit the converted enabling signal to the SEL pin of the selecting sub-circuit 052.

Figure 6:
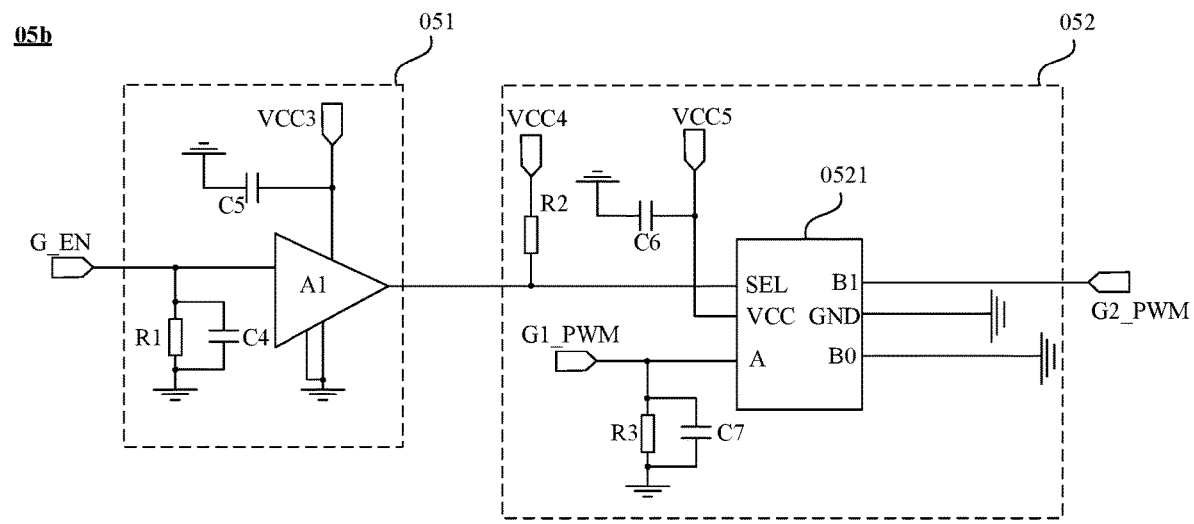
FIG. 6 is a schematic structural view of a selecting assembly corresponding to a green laser assembly, in accordance with some embodiments of the present disclosure.
Figure 7:
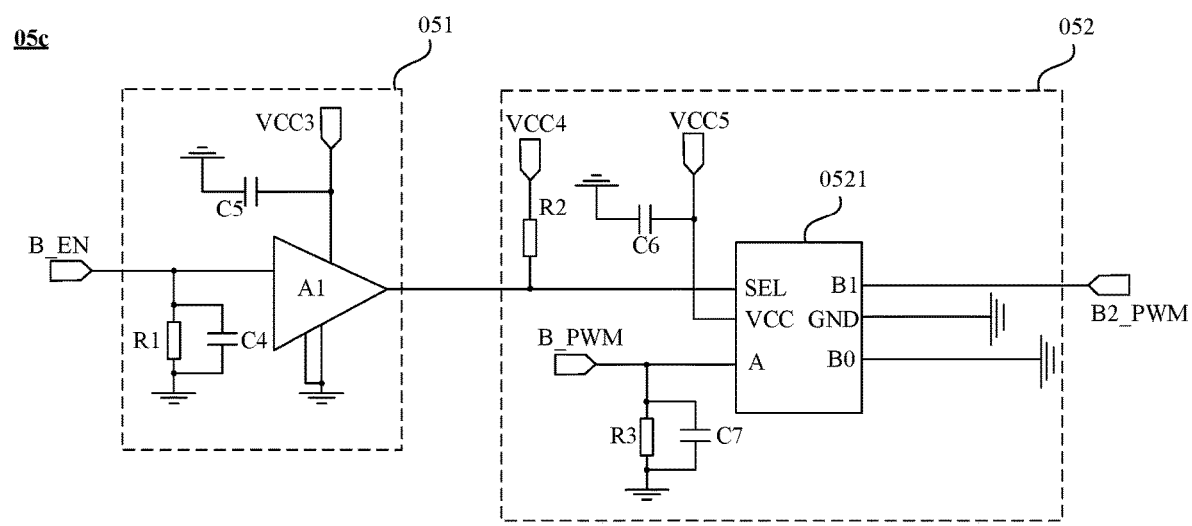
FIG. 7 is a schematic structural view of a selecting assembly corresponding to a blue laser assembly, in accordance with some embodiments of the present disclosure.

FIG. 6 is a schematic structural view of a selecting assembly 05b corresponding to a green laser assembly provided in an embodiment of the present disclosure, and FIG. 7 is a schematic structural view of a selecting assembly 05c corresponding to a blue laser assembly provided in an embodiment of the present disclosure. For the structures and connection relationships of the two selecting assemblies, reference may be made to the selecting assembly 05a corresponding to the red laser assembly shown in FIG. 5, which will not be repeated in the embodiment of the present disclosure.

In an implementation, as shown in FIG. 3, the laser light source driving unit 00 further includes a buffering circuit 06 which is connected to the display control circuit 01, the digital to analog converter 04 and the selecting assemblies 05.

The display control circuit 01 is configured to transmit each PWM signal and each enabling signal to the buffering circuit 06. The buffering circuit 06 is configured to: buffer each received PWM signal and each received enabling signal; output each buffered PWM signal to the digital to analog converter 04; and output each buffered enabling signal to the corresponding selecting assembly 05.

Figure 8:
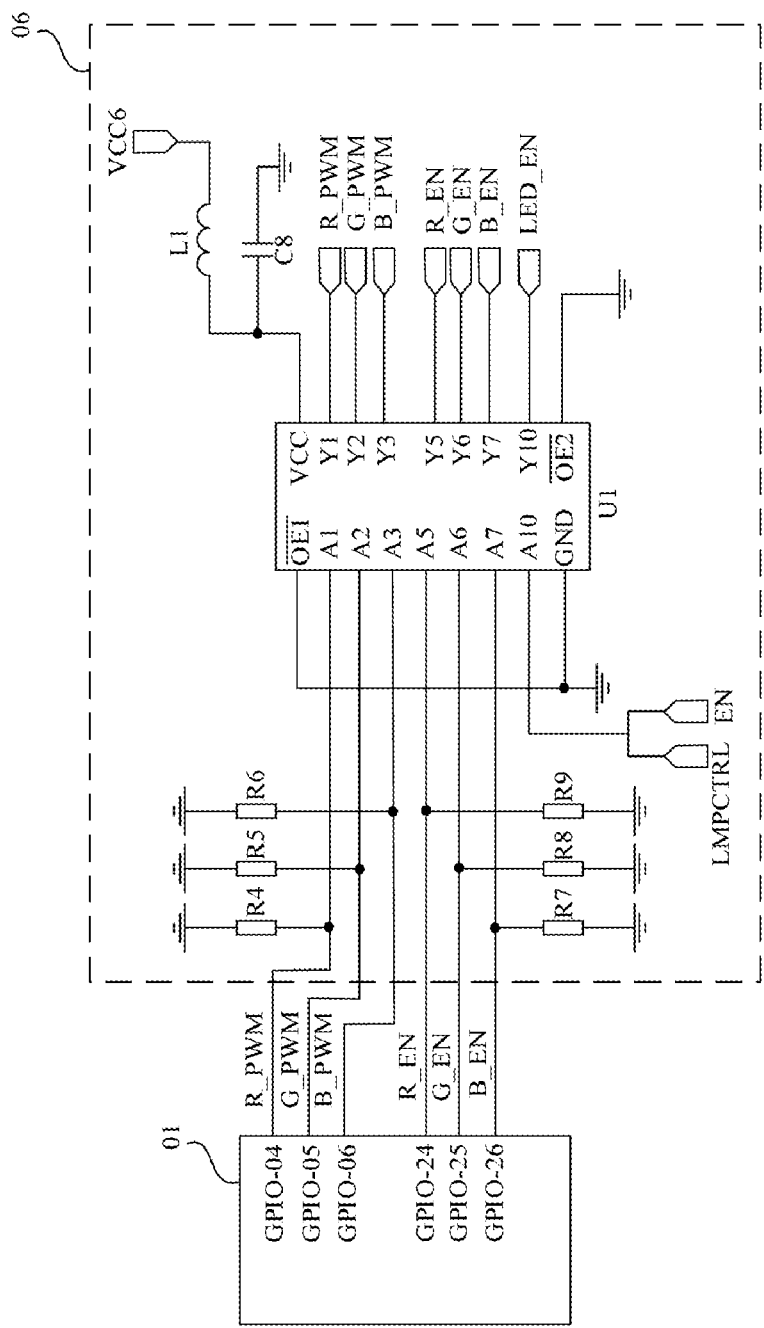
FIG. 8 is a schematic view of a local structure of a laser light source driving unit, in accordance with some embodiments of the present disclosure.

Illustratively, FIG. 8 is a schematic view of a local structure of a laser light source driving unit provided in an embodiment of the present disclosure. As shown in FIG. 3 and FIG. 8, the buffering circuit 06 can include a buffer (Buffer) chip U1. The display control circuit 01 can include a GPIO-04 pin for R_PWM, a GPIO-05 pin for outputting G_PWM, a GPIO-06 pin for outputting B_PWM, a GPIO-24 pin for outputting the enabling signal R_EN corresponding to the red laser assembly, a GPIO-25 pin for outputting the enabling signal G_EN corresponding to the green laser assembly, and a GPIO-26 pin for outputting the enabling signal B_EN corresponding to the blue laser assembly.

The Buffer chip U1 can include pins A1, A2, A3, A5, A6, A7, and A10, for a total of seven input pins, and pins Y1, Y2, Y3, Y5, Y6, Y7, and Y10, for a total of seven output pins. The U1 also includes an $\overline{OE1}$ pin, a GND pin, a VCC pin, and an $\overline{OE2}$ pin.

The A1 pin is connected to the GPIO-04 pin and one terminal of a resistor R4 to receive the PWM signal R_PWM provided by the display control circuit 01. The A2 pin is connected to the GPIO-05 pin and one terminal of a resistor R5 to receive the PWM signal G_PWM provided by the display control circuit 01. The A3 pin is connected to the GPIO-06 pin and one terminal of a resistor R6 to receive the PWM signal B_PWM provided by the display control circuit 01.

The A5 pin is connected to the GPIO-24 pin and one terminal of a resistor R9 to receive the enabling signal R_EN provided by the display control circuit 01. The A6 pin is connected to the GPIO-25 pin and one terminal of the resistor R8 to receive the enabling signal G_EN provided by the display control circuit 01. The A7 pin is connected to the GPIO-26 pin and one terminal of the resistor R7 to receive the enabling signal B_EN provided by the display control circuit 01.

Another terminal of the resistor R4, another terminal of the resistor R5, another terminal of the resistor R6, another terminal of the resistor R7, another terminal of the resistor R8, another terminal of the resistor R9, the $\overline{OE1}$ pin, and the $\overline{OE2}$ pin are all connected to ground. The VCC pin is connected to one terminal of an inductor L1 and one terminal of a capacitor C8. Another terminal of the inductor L1 is connected to the power supply terminal VCC6, and another terminal of the capacitor C8 is connected to ground.

The Y1 pin is connected to the INA pin of the digital to analog converter 04 to provide a buffered PWM signal R_PWM for the digital to analog converter 04. The Y2 pin is connected to the INB pin of the digital to analog converter 04 to provide a buffered PWM signal G_PWM for the digital to analog converter 04. The Y3 pin is connected to the INC pin of the digital to analog converter 04 to provide a buffered PWM signal B_PWM for the digital to analog converter 04.

The Y5 pin is connected to the second port of the operational amplifier A1 in the selecting assembly 05 corresponding to the red laser assembly, and is used to provide the enabling signal R_EN for the selecting assembly 05. The Y6 pin is connected to the second port of the operational amplifier A1 in the selecting assembly 05 corresponding to the green laser assembly, and is used to provide the enabling signal G_EN for the selecting assembly 05. The Y7 pin is connected to the second port of the operational amplifier A1 in the selecting assembly 05 corresponding to the blue laser assembly, and is used to provide the enabling signal B_EN for the selecting assembly 05.

The A10 pin is connected to a master control port LMPCTRL and an external master control port EN, where the master control port LMPCTRL can be connected to the display control circuit 01, and the external master control port EN can be connected to an external microcontroller. The Y10 pin is connected to an external power supply circuit to which the power supply pin of a driving chip U2 is connected. The master control port LMPCTRL and the external master control port EN are both used to control the potential of an LED_EN signal outputted from the Y10 pin of the Buffer chip U1. When the LED_EN signal is at the active potential, the external power supply circuit can supply power to the driving chip U2, and when the LED_EN signal is at an inactive potential, the external power supply circuit stops supplying power to the driving chip U2.

A 3V voltage may be provided by the power supply terminal VCC6. The resistance of the resistors R4 to R9 may be 10 kΩ. The parameter of the capacitor C8 may be 100 n/16 v. The type of the inductor L1 may be BLM15AG121SN1D.

Since the PWM signals and the enabling signals transmitted by the display control circuit 01 are transmitted to the subsequent circuit through the buffering circuit, the driving capabilities of the PWM signals and the enabling signals transmitted to the subsequent circuit are enhanced, and the stable and efficient operation of the subsequent circuit is guaranteed.

Figure 9:
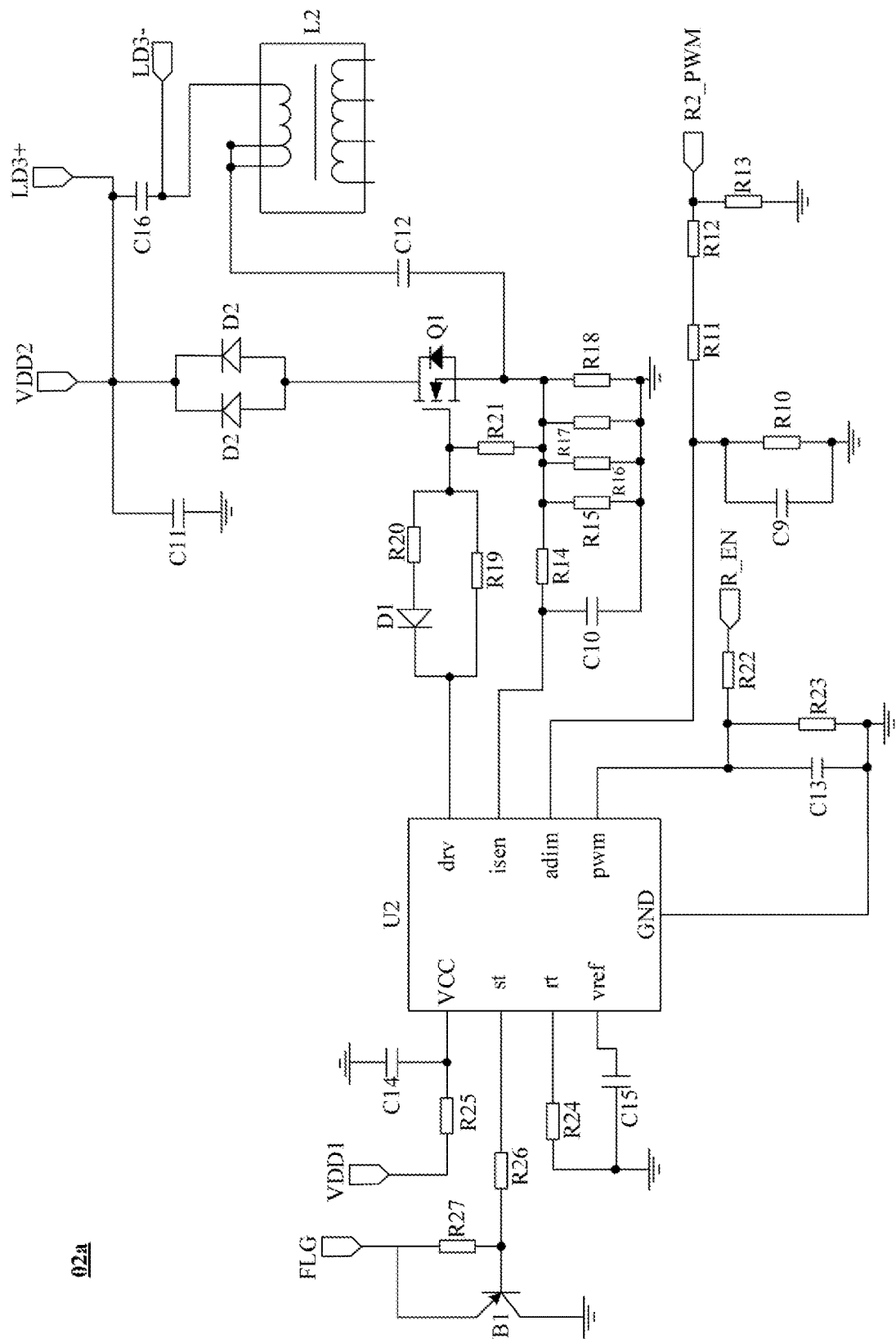
FIG. 9 is a schematic structural view of a power supply driving assembly corresponding to a red laser assembly, in accordance with some embodiments of the present disclosure.

FIG. 9 is a schematic structural view of a power supply driving assembly corresponding to a red laser assembly provided in an embodiment of the present disclosure. Taking the structure shown in FIG. 9 as an example, the structure of the power supply driving module will be described. As shown in FIG. 9, the power supply driving assembly 02a corresponding to the red laser assembly can include a driving chip U2 and an external sub-circuit connected to the driving chip U2. The external sub-circuit is also connected to the corresponding red laser assembly.

The external sub-circuit is configured to detect a driving current of the corresponding red laser assembly and transmit the driving current to the driving chip. The driving chip U2 is configured to adjust a duty cycle of a driving signal outputted to the external sub-circuit according to the driving current when the received enabling signal is at the active potential. The external sub-circuit is also configured to adjust the driving voltage according to the duty cycle of the driving signal.

Referring to FIG. 9, the driving chip U2 includes at least an rt pin, a dry pin, an isen pin, an adim pin, and a pwm pin. The external sub-circuit can include a positive output port LD3+ and a negative output port LD3−.

The adim pin of the driving chip U2 can be connected to the selecting assembly 05 corresponding to the red laser assembly through a voltage dividing resistor, such as to the B1 pin of the one-out-of-two selector 0521 in the selecting assembly 05, and can be used to receive the PWM signal R2_PWM provided by the assembly 05.

Illustratively, as shown in FIG. 9, the adim pin of the driving chip U2 can be connected to one terminal of a resistor R10 and one terminal of a resistor R11. Another terminal of the resistor R10 is connected to ground. The capacitor C9 is connected in parallel with the resistor R10. Another terminal of the resistor R11 is connected to one terminal of a resistor R12. Another terminal of the resistor R12 is connected to the selecting assembly 05 corresponding to the red laser assembly to receive the PWM signal R2_PWM provided by the selecting assembly 05. The another terminal of the resistor R12 is also connected to one terminal of a resistor R13. Another terminal of the resistor R13 is connected to ground. The resistor R10, the resistor R11 and the resistor R12 are voltage dividing resistors which could divide the voltage of the PWM signal R2_PWM provided by the selecting assembly 05, so that the voltage of the analog signal after the voltage dividing can match the rated voltage of the adim pin of the driving chip U2.

The isen pin of the driving chip U2 can be connected to a sampling resistor. Illustratively, the isen pin of the driving chip U2 can be connected to one terminal of the sampling resistor Risen through a resistor R14, and the one terminal of the sampling resistor Risen is also connected to the negative output port LD3−; and the isen pin of the driving chip U2 can be connected to another terminal of the sampling resistor Risen through a capacitor C10, and the another terminal of the sampling resistor Risen is connected to ground. The sampling resistor Risen can include a resistor R15, a resistor R16, a resistor R17, and a resistor R18 connected in parallel. The driving chip U2 can detect the driving current of the red laser assembly through the sampling resistor Risen.

The dry pin of the driving chip U2 can be connected to a switching field effect transistor Q1. Illustratively, the dry pin of the driving chip U2 can be connected to the gate of the switching field effect transistor Q1. The source of the switching field effect transistor Q1 is connected to one terminal of the sampling resistor Risen and one terminal of a transformer L2. Another terminal of the transformer L2 is connected to the negative output port LD3−. The drain of the switching field effect transistor Q1 is connected to the power supply terminal VDD2. The signal outputted from the dry pin of the driving chip U2 can control the switching state of the switching field effect transistor Q1, so that the switching field effect transistor Q1 in a conductive state connects the power supply terminal VDD2 and one terminal of the transformer L2, thereby changing the output voltage of the negative output port LD3− through the transformer L2. The switching field effect transistor may be a metal oxide semiconductor (MOS, Metal Oxide Semiconductor) field effect transistor.

Illustratively, the dry pin of the driving chip U2 can be connected to one terminal of a diode D1 and one terminal of a resistor R19. Another terminal of the diode D1 is connected to one terminal of a resistor R20. Another terminal of the resistor R19 and another terminal of the resistor R20 are connected to the gate of the switching field effect transistor Q1, as well as to one terminal of the sampling resistor Risen through a resistor R21. The drain of the switching field effect transistor Q1 can be connected to the power supply terminal VDD2 through two diodes D2 connected in parallel, and the power supply terminal VDD2 is also connected to one terminal of a capacitor C11. Another terminal of the capacitor C11 is connected to ground. The source of the switching field effect transistor Q1 can be connected to the transformer L2 through a capacitor C12.

The pwm pin of the driving chip U2 can be connected to one terminal of a resistor R22 and one terminal of a resistor R23. Another terminal of the resistor R22 is connected to the display control circuit 01 to receive the enabling signal R_EN which is provided by the display control circuit 01 and corresponds to the red laser assembly. Another terminal of the resistor R23 is connected to ground, and the capacitor C13 is connected in parallel with the resistor R23.

The rt pin of the driving chip U2 can be connected to one terminal of a resistor R24, and another terminal of the resistor R24 is connected to ground. The switching frequency of the switching field effect transistor Q1 can be determined by the resistance of the resistor R24. The switching frequency of the switching field effect transistor Q1 fulfills:

$$F_{OP}[\text{KHz}] = \frac{12.6 \times 10^3}{R24[K\Omega]}.$$

Further, the driving chip U2 can further include a VCC pin, an st pin, a vref pin, and a GND pin.

The VCC pin of the driving chip U2 can be connected to one terminal of a capacitor C14 and one terminal of a resistor R25. Another terminal of the capacitor C14 is connected to ground, and another terminal of the resistor R25 is connected to the power supply terminal VDD1.

The st pin of the driving chip U2 can be connected to one terminal of a resistor R26. Another terminal of the resistor R26 is connected to one terminal of a resistor R27 and the base of a triode B1. Another terminal of the resistor R27 is connected to the emitter of the triode B1 and an alarming terminal FLG, and the collector of the triode B1 is connected to ground. The alarming terminal FLG is used to output an alarming signal to an external power supply circuit connected to the power supply pin of the driving chip U2 when the power supply driving assembly 02 generates an abnormal current, causing the external power supply circuit to stop supplying power to the driving chip U2. The vref pin of the driving chip U2 can be connected to one terminal of a capacitor C15, and another terminal of the capacitor C15 is connected to ground. The GND pin of the driving chip U2 is connected to ground, and the positive output port LD3+ and the negative output port LD3− are connected to two terminals of a capacitor C16, respectively.

A 63V voltage can be provided by the power supply terminal VDD2. The resistance of each of the resistor R15, resistor R16 and resistor R18 is 0.3Ω (ohm). The resistance of the resistor R17 is 5.1Ω. The resistance of the resistor R20 is 22Ω. The resistance of the resistor 25 is 27Ω. The resistance of the resistors R14, resistor R22, and resistor R26 is 1 kΩ. The resistance of each of the resistor R11 and the resistor R12 is 3.3 kΩ. The resistance of each of the resistors R10, resistor R21, and resistor R27 is 10 kΩ. The resistance of the resistor R23 is 20 kΩ. The resistance of the resistor R24 is 51 kΩ. The resistance of the resistor R19 is 68 kΩ. The resistance of the resistor R13 is 100 kΩ. The parameters of the capacitor C9, capacitor C10, capacitor C11, capacitor C12, capacitor C13, capacitor C14, capacitor C15, and capacitor C16 can be 22 nF/50V, 100 pF (picofarad)/50V, 100 nF/250V, 100 pF/1000V, 100 pF/50V, 1 uF (microfarad)/50V, 1 uF/50V, and 1 uF/100V, respectively.

Figure 12:
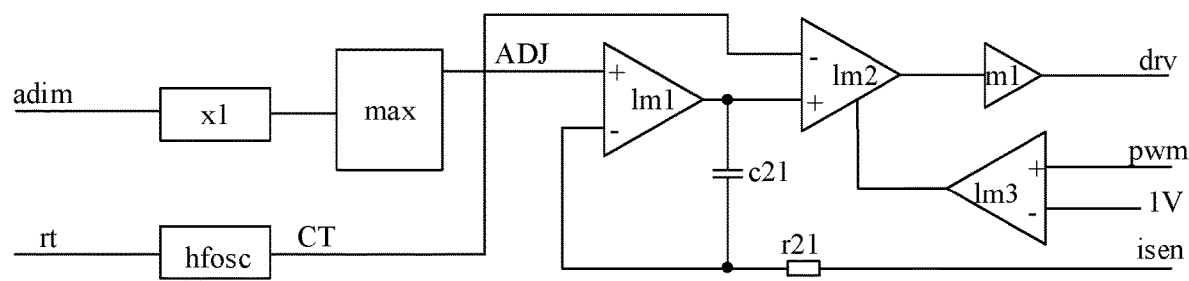
FIG. 12 is a schematic view of an internal structure of a driving chip, in accordance with some embodiments of the present disclosure.

FIG. 12 is a schematic view of an internal structure of a driving chip provided in an embodiment of the present disclosure. As shown in FIG. 12, the driving chip U2 can include a divider x1, a switching frequency square wave generator hfosc, a voltage limiter max, a comparator 1m1, a comparator 1m2, a comparator 1m3, a buffer m1, a resistor r21, and a capacitor c21.

The adim pin of the driving chip U2 can be connected to one terminal of the divider x1. The divider x1 is configured to divide the PWM signal transmitted at the adim pin by a reduction coefficient k which may be equal to 10. Another terminal of the divider x1 is connected to one terminal of the voltage limiter max which is connected to determine an output signal ADJ according to a voltage of a signal outputted by the divider x1. When the voltage of the signal outputted by the divider x1 is less than or equal to an upper limit voltage of the voltage limiter max, e.g., 300 mV (millivolt), the output signal ADJ outputted by the voltage limiter max is the signal outputted by the divider x1; when the voltage of the signal outputted by the divider x1 is greater than the upper limit voltage, the voltage of the output signal ADJ outputted by the voltage limiter max is the upper limit voltage.

Each of the comparators 1m1 and 1m3 has two inputs, i.e., a positive input terminal and a negative input terminal, as well as one output terminal. The comparator 1m2 has a total of 3 input terminals, i.e., a positive input terminal, a negative input terminal and an enabling input terminal, as well as one output terminal.

The positive input terminal of the comparator 1m1 is connected to another terminal of the voltage limiter max. The negative input terminal of the comparator 1m1 is connected to one terminal of the resistor r21 and one terminal of the capacitor c21, and another terminal of the resistor r21 is connected to the isen pin. The output terminal of the comparator 1m1 can be connected to another terminal of the capacitor c21. The comparator 1m1 is configured to compare the voltages of the positive input terminal and the negative input terminal. When the voltage at the positive input terminal of the comparator 1m1 is greater than the voltage at the negative input terminal (that is, the product of the driving current of the isen pin and the resistor r21), an output logic value of the comparator 1m1 may be 1. When the voltage at the positive input terminal of the comparator 1m1 is less than the voltage at the negative input terminal, the output logic value of the comparator 1m1 may be 0.

The positive input terminal of the comparator 1m2 is connected to the output terminal of the comparator 1m1. The negative input terminal of the comparator 1m2 is connected to one terminal of the switching frequency square wave generator hfosc, and another terminal of the switching frequency square wave generator hfosc is connected to the rt pin. The enabling input terminal of the comparator 1m2 is connected to the output terminal of the comparator 1m3. The switching frequency square wave generator hfosc is configured to output a square wave of the switching frequency according to the switching frequency determined by the resistance of the resistor R24. The output terminal of the comparator 1m2 is connected to one terminal of the buffer m1, and another terminal of the buffer m1 is connected to the dry pin. The buffer m1 is configured to enhance the driving capability of a signal outputted from the output terminal of the comparator 1m2. The comparator 1m2 is configured to compare the voltages of the positive input terminal and the negative input terminal when its enabling input is active. When the voltage at the positive input terminal of the comparator 1m2 is greater than the voltage at the negative input terminal, an output logic value of the comparator 1m2 is 1. When the voltage at the positive input terminal of the comparator 1m2 is less than the voltage at the negative input terminal, the output logic value of the comparator 1m2 is 0.

The positive input terminal of the comparator 1m3 is connected to the pwm pin, and the negative input terminal of the comparator 1m3 is connected to a DC power supply terminal whose voltage may be 1V. The comparator 1m3 is configured to compare the voltages of the positive input terminal and the negative input terminal. When the voltage at the positive input terminal of the comparator 1m3 is greater than the voltage at the negative input terminal, an output logic value of the comparator 1m3 is 1. When the voltage at the positive input terminal of the comparator 1m3 is less than the voltage at the negative input terminal, the output logic value of the comparator 1m3 is 0.

As can be known according to the above descriptions about the driving chip U2, the enabling signal R_EN which is inputted by the pwm pin of the driving chip U2 and corresponds to the red laser assembly is the enabling signal for the driving chip U2. When the enabling signal R_EN is at the active potential, the driving chip U2 works normally. The driving chip U2 can adjust the duty cycle of the driving signal outputted by the dry pin according to the voltage of the R_PWM signal inputted by the adim pin and the driving current of the red laser assembly inputted by the isen pin, thereby adjusting the output voltage at the negative output port LD3− through the external sub-circuit, which in turn adjusts the driving voltage loaded to the red laser assembly, allowing for the red laser assembly to work at a constant current. When the enabling signal R_EN is at an inactive potential, the driving chip U2 stops working, and the red laser assembly does not emit light.

As can be seen with reference to FIG. 9 and FIG. 12, in the embodiment of the present disclosure, the voltage of the adim pin of the driving chip U2 in the power supply driving assembly 02 may satisfy:

$$U_{adim}[mV] = \frac{R10}{R10 + R11 + R12} \times U_{R2\_PWM}[mV],$$

where $U_{R2\_PWM}$ is the voltage of the PWM signal R2_PWM received by the power supply driving assembly 02, in millivolt.

Accordingly, the driving current provided by the power supply driving assembly 02 to the corresponding laser assembly through the laser driving assembly may be:

$$I_{laser}[mA] = \frac{U_{adim}[mV]}{k \times R_{isen}[\Omega]},$$

where k is the reduction coefficient of the divider x1 in the driving chip U2, $R_{isen}$ is the above-mentioned sampling resistor, in ohm. That is, $R_{isen}$ R15//R16//R17//R18.

In the above power supply driving assembly 02, it should be noted that various electronic elements connected to the driving chip U2 may be elements in the external sub-circuit.

Figure 10:
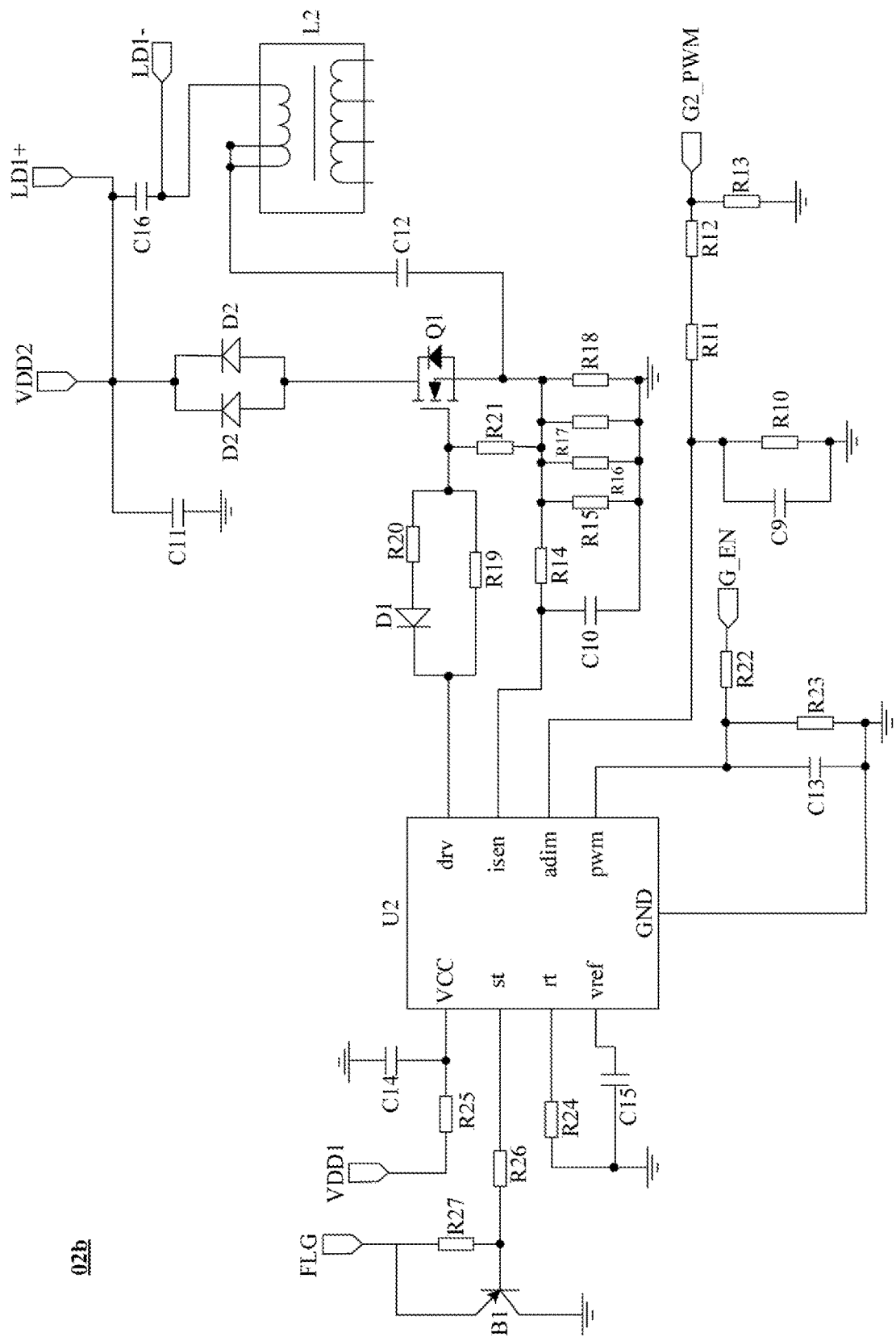
FIG. 10 is a schematic structural view of a power supply driving assembly corresponding to a green laser assembly, in accordance with some embodiments of the present disclosure.
Figure 11:
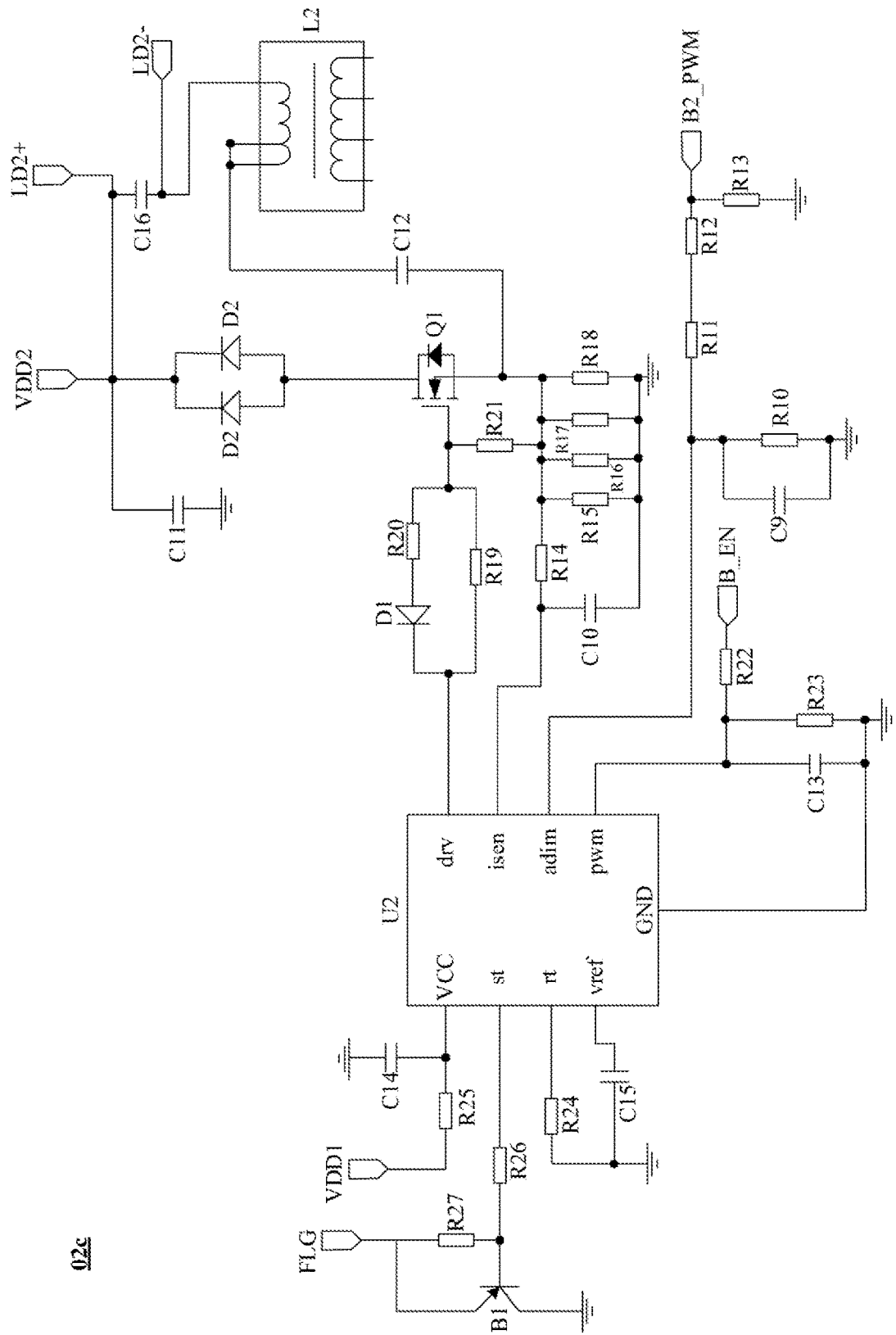
FIG. 11 is a schematic structural view of a power supply driving assembly corresponding to a blue laser assembly, in accordance with some embodiments of the present disclosure.

It should be noted that the three power supply driving assemblies 02 have the same structures. In the embodiment of the present disclosure, an illustration is made using the structure of the red power supply driving assembly 02a corresponding to the red laser assembly as shown in FIG. 9 as an example. The red power supply driving assembly 02a can be referred to for the structure, connection relationship and working principle of the power supply driving assemblies corresponding to the laser assemblies of other colors (the green power supply driving assembly 02b corresponding to the green laser assembly as shown in FIG. 10, and the blue power supply driving assembly 02c corresponding to the blue laser assembly as shown in FIG. 11).

In an implementation, the power supply driving assembly can drive the corresponding laser assembly to emit light using boost driving or buck driving. The boost driving may refer to raising a lower power supply voltage provided by the power supply to the working voltage of the laser assembly, so that the laser assembly can work normally under a constant current. The buck driving may refer to lowering a higher power supply voltage provided by the power supply to the working voltage of the laser assembly, so that the laser assembly can work normally under a constant current. The power supply driving assembly provided in the embodiment of the present disclosure may drive the corresponding laser assembly to emit light using buck driving. The difference between the power supply voltage and a typical voltage of the working voltage may be less than 20V.

Table 1 shows the correspondence between the constant current and the typical voltage of the working voltage for the red laser assembly, the green laser assembly and the blue laser assembly.

TABLE 1

| Laser assembly | Red laser assembly | Green laser assembly | Blue laser assembly |
| --- | --- | --- | --- |
| Constant working current/A | 4.7 | 1.6 | 3 |
| Typical voltage/V | 60 | 114 | 99 |

As shown in Table 1, the constant current is 4.7 A, and the typical voltage is 60V, for the red laser assembly. The green laser assembly requires a constant working current of 1.6 A, and its typical voltage is 114V (under special circumstances, this typical voltage can reach up to 126V). The blue laser assembly requires a constant working current of 3 A and a typical voltage of 99V.

In connection with Table 1, it can be known that the power supply voltage provided by the power supply connected to the power supply driving assembly corresponding to the red laser assembly may be 61V~70V, e.g., 61V, 63V, or 70V. The initial voltage of the power supply driving assembly corresponding to the green laser assembly may be 115V~140V, e.g., 115V, 125V, or 140V The initial voltage of the power supply driving assembly corresponding to the blue laser assembly may be 100V~109 V, e.g., 100V, 105V, or 109V.

Figure 13:
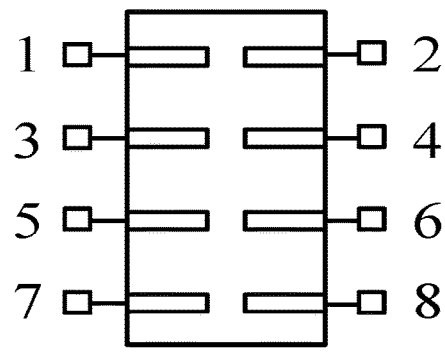
FIG. 13 is a schematic structural view of a laser driving assembly, in accordance with some embodiments of the present disclosure.

In an implementation, FIG. 13 is a schematic structural view of a laser driving assembly provided in an embodiment of the present disclosure. As shown in FIG. 13, the laser driving assembly 03 includes a total of 8 pins from pin 1 to pin 8. The pin 1 (or pin 2) can be connected to the negative output port of the power supply driving assembly 02, and pin 7 (or pin 8) can be connected to the positive output port of the power supply driving assembly. The pin 2 (or pin1) is used to connect to a negative pole of the laser assembly, and pin 8 (or pin1) is used to connect to a positive pole of the laser assembly. The laser driving assembly 03 is a middleware to realize the connection between the power supply driving assembly and laser assembly.

Illustratively, for the laser driving assembly corresponding to the red laser assembly, the pin 1 can be connected to the negative output port LD3− of the power supply driving assembly 02a as shown in FIG. 9, the pin 7 can be connected to the positive output port LD3+ of the power supply driving assembly 02a as shown in FIG. 9, the pin 2 can be connected to the negative pole of the red laser assembly, and the pin 8 can be connected to the positive pole of the red laser assembly.

For the laser driving assembly corresponding to the green laser assembly, the pin 1 can be connected to the negative output port LD1− of the power supply driving assembly 02b as shown in FIG. 10, the pin 7 can be connected to the positive output port LD1+ of the power supply driving assembly 02b as shown in FIG. 10, the pin 2 can be connected to the negative pole of the green laser assembly, and the pin 8 can be connected to the positive pole of the green laser assembly. The voltage provided by the negative output port LD1− for the pin 1 may be 14V, and the voltage provided by the positive output port LD1+ for the pin 7 may be 140V.

For the laser driving assembly corresponding to the blue laser assembly, the pin 1 can be connected to the negative output port LD2− of the power supply driving assembly 02c as shown in FIG. 11, the pin 7 can be connected to the positive output port LD2+ of the power supply driving assembly 02c as shown in FIG. 11, the pin 2 can be connected to the negative pole of the blue laser assembly, and the pin 8 can be connected to the positive pole of the blue laser assembly.

In an implementation of the embodiment of the present disclosure, the driving period of each laser light source can include a timing sequenced output phase and a superimposed output phase. In the timing sequenced output phase, the durations during which the three enabling signals outputted by the display control circuit are at the active potential do not overlap with each other, while in the superimposed output phase, and the three enabling signals outputted by the display control circuit are all at the active potential.

It is assumed that the laser light source includes the red laser assembly, the green laser assembly, and the blue laser assembly. In the timing sequenced output phase, the display control circuit outputs a red enabling signal R_EN corresponding to the red laser assembly, a green enabling signal G_EN corresponding to the green laser assembly and a blue enabling signal B_EN corresponding to the blue laser assembly that are at the active potential in sequence. In the superimposed output phase, the display control circuit outputs a red enabling signal R_EN, a green enabling signal G_EN and a blue enabling signal B_EN that are all at the active potential.

Figure 14:
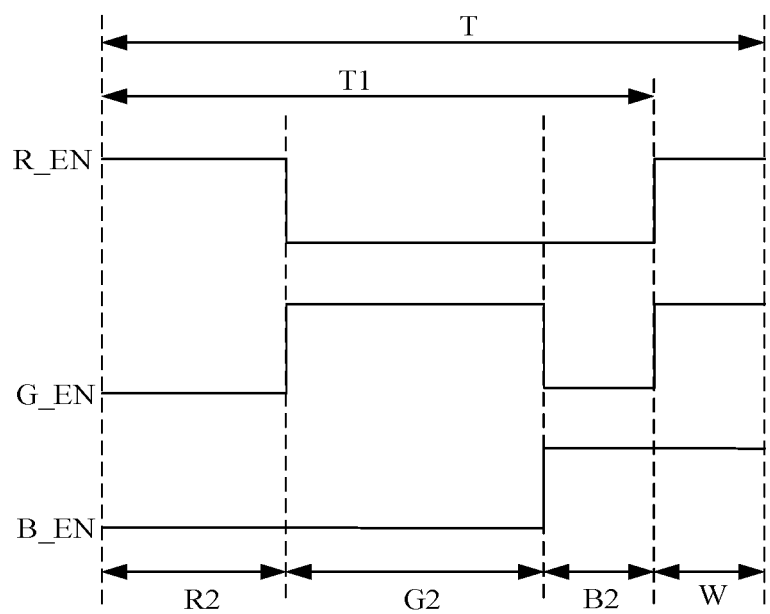
FIG. 14 is a schematic timing sequence diagram of an enabling signal, in accordance with some embodiments of the present disclosure.

Illustratively, as shown in FIG. 14, in the timing sequenced output phase Ti of the driving period T, the duration M1 for which the red enabling signal R_EN is at the active potential accounts for 28% of the driving period T, the duration M2 for which the green enabling signal G_EN is at the active potential accounts for 43% of the driving period T, and the duration M3 for which the blue enabling signal B_EN is at the active potential accounts for 14% of the driving period. The duration of the superimposed output phase W accounts for 15% of the driving period T.

The proportion of the duration for which each of the foregoing enabling signals is at the active potential in each driving period can be determined according to optimal color coordinates required by the image quality of the laser projection device hosting the laser light source. The optimal color coordinates may be fixed color coordinates pre-determined based on market research and user experience. Then, the optimal color coordinates are used to derive the proportions of the lighting durations of the three laser assemblies in each driving period. Then, a duty cycle is determined for the enabling signal corresponding to each laser assembly according to the proportion.

It is assumed that the proportions of the lighting durations of the red laser assembly, the green laser assembly and the blue laser assembly which are determined according to the optimal color coordinates for each driving period is 2:3:1. If the driving period includes only the timing sequenced output phase, then M1:M2:M3=2:3:1. The M1, M2, and M3 refer to the durations for which the red enabling signal, the green enabling signal, and the blue enabling signal are at the active potential in each driving period, respectively.

If M1:M2:M3=2:3:1 fulfills the color coordinate requirements but not the brightness requirements of the laser projection device, the superimposed output phase W can be added into each driving period to improve the brightness of the laser light source, under the premise of keeping the optimal color coordinates unchanged. In order to ensure that the optimal color coordinates do not change, (M1+W):(M2+W):(M3+W)=2:3:1 need to be ensured. The M1, M2, and M3 respectively refer to the durations in the timing sequenced output phase for which the red enabling signal, the green enabling signal, and the blue enabling signal are at the active potential, and W refers to the duration of the superimposed output phase.

$$\frac{M1+W}{M1}$$

can represent the degree of brightness increase for the laser light source relative to the driving period including only the timing sequenced output phase.

In this way, by adding into the driving period the superimposed output phase in which three laser assemblies are all lit simultaneously and the laser light source emits white light, the brightness of the laser light source can be increased without changing the proportions of the lighting durations of the laser assemblies in the driving period (i.e., without changing the proportions of the primary colors in the original white balance).

It should be pointed out that each of the above-mentioned laser assemblies 100 may be a multichiped laser (MCL) assembly. In the related art, a modular laser assembly (a.k.a., a bank laser assembly) is typically used. Because the MCL is smaller in volume than the bank laser assembly, the volume of the laser light source is reduced.

Figure 15:
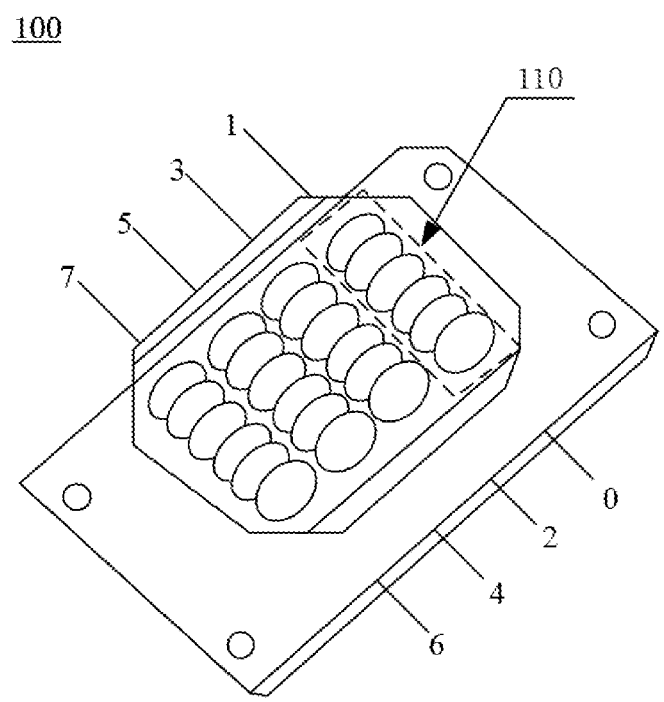
FIG. 15 is a schematic structural view of a laser assembly, in accordance with some embodiments of the present disclosure.

Each laser assembly 100 typically includes a plurality of laser units. Illustratively, FIG. 15 is a schematic structural view of a laser assembly provided in an embodiment of the present disclosure. As shown in FIG. 15, each laser assembly 100 typically includes four laser units 110, and each laser unit 110 includes a plurality of transistor outlines (TOs) connected in series. For example, each laser unit 110 may include five TOs connected in series. That is, each laser assembly 100 may adopt a 4×5 arrangement, including a total of 20 TOs. Or, each laser unit 110 may include 6 TOs connected in series. That is, each laser assembly 100 may adopt a 4×6 arrangement, including a total of 24 TOs. Or, each laser unit 110 may include 7 TOs connected in series. That is, each laser assembly 100 may adopt a 4×7 arrangement, including a total of 28 TOs.

It should be noted that, in the embodiment of the present disclosure, each laser assembly may also include three laser units, with each laser unit including five TOs connected in series. That is, each laser assembly may adopt a 3×5 arrangement, including a total of 15 TOs. Or, each laser assembly may also include two laser units, with each laser unit including seven TOs connected in series. That is, each laser assembly may adopt a 2×7 arrangement, including a total of 14 TOs. In FIG. 15, the laser assembly 100 including four laser units with each laser unit including 6 TOs connected in series is taken as an example, but the arrangement of the laser assembly is not limited thereto.

In the embodiment of the present disclosure, the plurality of laser units 110 can be connected in series, which are then connected to the laser driving assembly 03. For example, the plurality of laser units may be connected in series by two methods: wired series and onboard series. The wired series refers to that the plurality of laser units are connected in sequence by wires. The onboard series refers to that the plurality of laser units are connected in sequence by layout wiring in the process of patterning the layout of the laser driving assembly.

Figure 16:
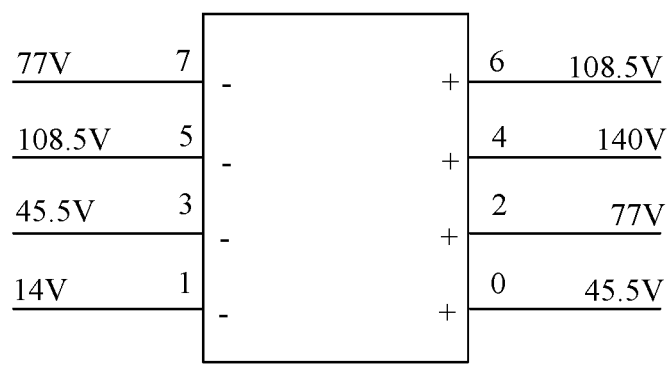
FIG. 16 is an equivalent circuitry diagram of a laser assembly, in accordance with some embodiments of the present disclosure.

Illustratively, FIG. 16 is an equivalent circuitry diagram of a laser assembly provided in an embodiment of the present disclosure. As shown in FIG. 15 and FIG. 16, it is assumed that the illustrated laser assembly is a green laser assembly that includes four laser units 110, with each laser unit 110 including two ports. Thus, four laser units include a total of eight ports, i.e., port 0 to port 7. The port 0, port 2, port 4, and port 6 are positive, and the port 1, port 3, port 5, and port 7 are negative. The port 5 can be connected to the port 6, the port 7 can be connected to the port 2, and the port 3 can be connected to the port 0. Thus, the port 4 can be connected to the pin 8 of the laser driver assembly 03 corresponding to the green laser assembly, and the port 1 can be connected to the pin 2 of the laser driving assembly 03 corresponding to the green laser assembly. The 140V voltage transmitted by the power supply driving assembly 02 can be transmitted through the laser driving assembly 03 to the third laser unit, where the voltage is reduced to 108.5V, and then transmitted to the fourth laser unit, where the voltage is reduced to 77V, and then transmitted to the second laser unit, where the voltage is reduced to 45.5V, and finally transmitted to the first laser unit, where the voltage is reduced to 14V, causing the laser assembly 100 to emit light.

Figure 17:
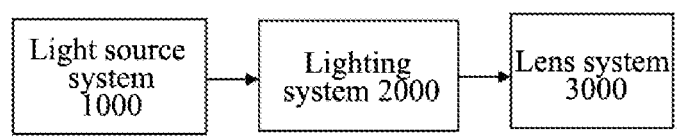
FIG. 17 is a schematic structural view of a laser projection device, in accordance with some embodiments of the present disclosure.

Further, please refer to FIG. 17, which shows a schematic structural diagram of a laser projection device provided by the present disclosure. As shown in FIG. 17, the laser projection device includes, in addition to a light source system 1000, a lighting system 2000 and a lens system 3000 that are sequentially arranged along a beam transmission direction of the laser light source 10 in the light source system 1000. The lighting system 2000 can include a light machine configured to modulate laser light to output an image beam when illuminated by the laser light emitted from the laser light source. The lens system 3000 is configured to project the image beam onto a projection screen. The light source system 1000, the lighting system 2000, and the lens system 3000 can be collectively referred to as an optical engine module. In an implementation, the laser projection device can further include a heat dissipation system, a housing, a sound system, and the like.

Accordingly, in the laser projection device provided by the embodiment of the present disclosure, the display control circuit can output a PWM signal and an enabling signal corresponding to each laser assembly, and can transmit the output signals to the corresponding power supply driving assembly which can, in turn, load a driving voltage for the corresponding laser driving assembly according to the PWM signal and the enabling signal, so that the laser driving assembly can drive the laser assembly to emit light, thereby achieving independent control of each laser assembly.

Other implementations of the present disclosure will be apparent to those skilled in the art from consideration of the specification and practice of the present disclosure. This application is intended to cover any variations, uses, or adaptations of the present disclosure following the general principles thereof and including common knowledge and conventional technical means in the art that are not described in the present disclosure. The specification and embodiments are to be considered as exemplary only, with the true scope and spirit of the disclosure being indicated by the claims.

It should be understood that the present disclosure is not limited to the precise structures that have been described above and illustrated in the accompanying drawings, and various modifications and changes can be made without departing from the scope thereof. It is intended that the scope of the invention should only be limited by the appended claims.

What is claimed is:

1. A laser projection device, comprising:
a laser light source, comprising three laser assemblies emitting lasers of different colors; and
a laser light source driving unit, connected to the laser light source, and comprising:
a display control circuit, configured to: output, based on three primary color components of an image to be displayed, three pulse width modulation (PWM) signals corresponding to the three laser assemblies, and output three enabling signals corresponding to the three laser assemblies;
power supply driving assemblies, connected to the display control circuit and configured to receive the PWM signals outputted from the display control circuit, wherein the power supply driving assemblies include three power supply driving assemblies connected to the three laser assemblies in a one-to-one correspondence; and
laser driving assemblies, comprising three laser driving assemblies connected to the three power supply driving assemblies in a one-to-one correspondence,
wherein the display control circuit is configured to transmit an enabling signal corresponding to each of the laser assemblies to a corresponding one of the power supply driving assemblies when transmitting a PWM signal corresponding to each of the laser assemblies;
each of the power supply driving assemblies is configured to load a driving voltage to a corresponding one of the laser driving assemblies according to a voltage of a received PWM signal, when a received enabling signal is at an active potential; and
each of the laser driving assemblies is configured to drive a corresponding one of the laser assemblies to emit light according to the driving voltage.

2. The laser projection device according to claim 1, wherein the laser light source comprises a red laser assembly, a green laser assembly and a blue laser assembly, and a driving period comprises a timing sequenced output phase and a superimposed output phase; wherein:
in the timing sequenced output phase, a red enabling signal corresponding to the red laser assembly, a green enabling signal corresponding to the green laser assembly, and a blue enabling signal corresponding to the blue laser assembly are at the active potential in sequence; and in the superimposed output phase, the red enabling signal, the green enabling signal and the blue enabling signal are all at the active potential.

3. The laser projection device according to claim 2, wherein:
in the timing sequenced output phase, a duration for which the red enabling signal is at the active potential accounts for 28% of the driving period, a duration for which the green enabling signal is at the active potential accounts for 43% of the driving period, and a duration for which the blue enabling signal is at the active potential accounts for 14% of the driving period; and
a duration of the superimposed output phase accounts for 15% of the driving period.

4. The laser projection device according to claim 1, wherein the laser light source driving unit further comprises: a digital to analog converter;
the digital to analog converter is connected to the display control circuit and the three power supply driving assemblies;
the display control circuit is configured to transmit the three PWM signals to the digital to analog converter; and
the digital to analog converter is configured to convert each received PWM signal into an analog signal, and transmit each analog signal to a corresponding one of the power supply driving assemblies.

5. The laser projection device according to claim 4, wherein the laser light source driving unit further comprises: three selecting assemblies corresponding to the three laser assemblies;
each of the selecting assemblies is connected to the display control circuit, the digital to analog converter, and a corresponding one of the power supply driving assemblies;
the display control circuit is further configured to transmit each of the enabling signals to a corresponding one of the selecting assemblies;
the digital to analog converter is further configured to transmit each analog signal to a corresponding one of the selecting assemblies; and
each of the selecting assemblies is configured to transmit a received analog signal to a corresponding one of the power supply driving assemblies when a received enabling signal is at the active potential.

6. The laser projection device according to claim 5, wherein each of the selecting assemblies comprises: an adapting sub-circuit and a selecting sub-circuit; wherein:
the adapting sub-circuit is connected to the display control circuit and the selecting sub-circuit, and is configured to convert a voltage of the received enabling signal to a rated voltage of the selecting sub-circuit and transmit the voltage-converted enabling signal to the selecting sub-circuit; and
the selecting sub-circuit is further connected to the digital to analog converter, and is configured to transmit the received analog signal to the corresponding one of the power supply driving assemblies when the received enabling signal is at the active potential.

7. The laser projection device according to claim 5, wherein the laser light source driving unit further comprises: a buffering circuit, which is connected to the display control circuit, the digital to analog converter, and the selecting assemblies; wherein:
the display control circuit is configured to transmit each of the PWM signals and each of the enabling signals to the buffering circuit; and
the buffering circuit is configured to: buffer each received PWM signal and each received enabling signal; output each buffered PWM signal to the digital to analog converter; and output each buffered enabling signal to the corresponding one of the selecting assemblies.

8. The laser projection device according to claim 1, wherein each of the power supply driving assemblies comprises: a driving chip and an external sub-circuit; wherein:
the external sub-circuit is connected to the driving chip and a corresponding one of the laser assemblies, and is configured to detect a driving current of the corresponding one of the laser assemblies and transmit the driving current to the driving chip; and
the driving chip is configured to adjust a duty cycle of a driving signal outputted to the external sub-circuit according to the driving current when the received enabling signal is at the active potential.

9. The laser projection device according to claim 8, wherein the external sub-circuit is further configured to adjust the driving voltage according to the duty cycle of the driving signal.

10. The laser projection device according to claim 1, wherein each of the laser assemblies comprises a plurality of laser units connected in series, wherein each of the laser units comprises a plurality of transistor outlines connected in series.

11. The laser projection device according to claim 1, further comprising: a light source system comprising the laser light source; and an lighting system and a lens system which are sequentially arranged along a beam transmission direction of the laser light source in the light source system, wherein the lighting system is configured to, when illuminated by laser light emitted from the laser light source, modulate the laser light to output an image beam, and the lens system is configured to project the image beam onto a projection screen.

* * * * *